(12) United States Patent
Saida et al.

(10) Patent No.: US 6,959,606 B2
(45) Date of Patent: Nov. 1, 2005

(54) PRESSURE DETECTION INDICATION DEVICE AND CLOG DETECTOR USING PRESSURE DETECTION INDICATION DEVICE

(75) Inventors: Yoshitaka Saida, Wako (JP); Shigehiko Miura, Takanezawa-machi (JP); Nobuyuki Uba, Tokyo (JP)

(73) Assignees: Honda Motor Co., Ltd., Tokyo (JP); Keihin Corporation, Tokyo (JP); Fujikoki Corporation, Tokyo (JP)

( * ) Notice: Subject to any disclaimer, the term of this patent is extended or adjusted under 35 U.S.C. 154(b) by 0 days.

(21) Appl. No.: 10/895,400

(22) Filed: Jul. 21, 2004

(65) Prior Publication Data

US 2005/0034524 A1   Feb. 17, 2005

(30) Foreign Application Priority Data

Jul. 24, 2003   (JP) .............................. 2003-201020

(51) Int. Cl.$^7$ .............................................. G01L 7/00
(52) U.S. Cl. ...................................................... 73/714
(58) Field of Search ........................... 73/705, 706, 714, 73/715–728, 754–756; 250/231.19; 356/440; 114/113; 340/606; 600/300, 500

(56) References Cited

U.S. PATENT DOCUMENTS

| 4,486,744 A | * | 12/1984 | Pratt et al. .................. 340/606 |
| 5,828,458 A | * | 10/1998 | Taylor et al. ............... 356/440 |
| 6,126,595 A | * | 10/2000 | Amano et al. ............. 600/300 |

FOREIGN PATENT DOCUMENTS

JP        2004-36699        2/2004

* cited by examiner

*Primary Examiner*—William Oen
(74) *Attorney, Agent, or Firm*—Westerman, Hattori, Daniels & Adrian, LLP

(57) ABSTRACT

The invention provides a pressure detection indication device with a simple structure. The pressure detection indication device 1 comprises a main body 11 having an internal space 111 of the body communicating with a space to be subjected to pressure detection, a case 12 having an internal space 121 of the case communicating with a space different from that communicated with the internal space 111, a diaphragm 14 airtightly separating the internal space 111 of the body from the internal space 121 of the case, an indication mark disposed on the diaphragm and placed in the internal space of the case, a lens 13 disposed within the case, a stopper member 15 attached to the diaphragm 14, a biasing means 17 for biasing the diaphragm 14 toward the lens, and a stopper receive surface 117 provided in the internal space 111.

6 Claims, 4 Drawing Sheets

PRESSURE DETECTION INDICATION DEVICE AND CLOG DETECTOR USING PRESSURE DETECTION INDICATION DEVICE

The present application claims priority from Japanese patent application 2003-201020 filed on Jul. 24, 2003, the content of which is hereby incorporated by reference into this application.

FIELD OF THE INVENTION

The present invention relates to a pressure detection indication device capable of detecting and indicating the change in pressure with a simple structure, and a clog detector using the pressure detection indication device.

DESCRIPTION OF THE RELATED ART

Conventionally, in an air conditioning device of a vehicle, for example, the clogging of a filter disposed inside an air circulation pipeline is detected by removing the filter from the air conditioning device during vehicle inspection or the like and visually checking the filter.

According to such method, however, it is difficult to detect the clogging of the filter caused relatively soon after the vehicle inspection, and in such a case, the air conditioning device is used with the efficiency deteriorated, which may negatively affect the air conditioning operation.

In an attempt to solve this problem, Japanese Patent Application No. 2002-192514 discloses a filter clog detecting device comprising a pressure communication pipe diverged from either a primary side or a secondary side of a filter, a chamber disposed to the end of the pressure communication pipe, a lens disposed to the end of the chamber, a diaphragm spread across the chamber in parallel to the lens, a mark attached to a surface of the diaphragm facing the lens, and a vent channel disposed between the diaphragm and the lens, characterized in that the degree of clogging of the filter is detected by the change in the mark image observed via the lens from the exterior caused by the movement of the diaphragm toward or away from the lens corresponding to the pressure at the primary side or secondary side of the filter.

According to the above-described filter clog detecting device, the clogging of the filter can be detected easily and reliably, but when the pressure within the chamber is reduced extremely, the diaphragm is pulled toward the air flow passage and may be damaged or deteriorated in performance. Further, upon visually observing the mark image, the image cannot be observed correctly if viewed from an oblique direction.

SUMMARY OF THE INVENTION

The present invention aims at providing a pressure detection indication device that can be easily used to detect the clogging of a filter of an air conditioning device or the like, capable of detecting the reduction of pressure at the downstream side of the filter (toward the suction fan) without removing the filter, and indicating the state of the filter.

Moreover, the present invention aims at providing a pressure detection indication device capable of preventing the diaphragm from being damaged, having the mark image visually observed correctly, and having the operating pressure set up at will.

In order to achieve the above objects, the pressure detection indication device according to the present invention comprises a diaphragm airtightly separating an internal space communicated from the space subjected to pressure detection with a space communicated with the exterior, a lens disposed at one side of the diaphragm, and an indication mark provided to the surface of the diaphragm facing the lens and biased toward the lens from the back side thereof.

According to further aspects of the present invention, the indication mark of the pressure detection indication device is provided on the surface of a stopper member fixed to a member attached airtightly to the diaphragm and biased toward the lens from the internal space, and that the mark consists of concentrically arranged and colored multiple circles.

Actually, the present invention provides a pressure detection indication device comprising a main body having an internal space of the body communicating with a space to be subjected to pressure detection, a case having an internal space of the case communicating with a space that is different from the internal space of the body, a diaphragm airtightly separating the internal space of the body from the internal space of the case, an indication mark attached to the diaphragm and positioned in the internal space of the case, a lens disposed within the case, and a biasing means biasing the diaphragm toward the lens.

DETAILED DESCRIPTION OF THE PREFERRED EMBODIMENT

Figure 1:
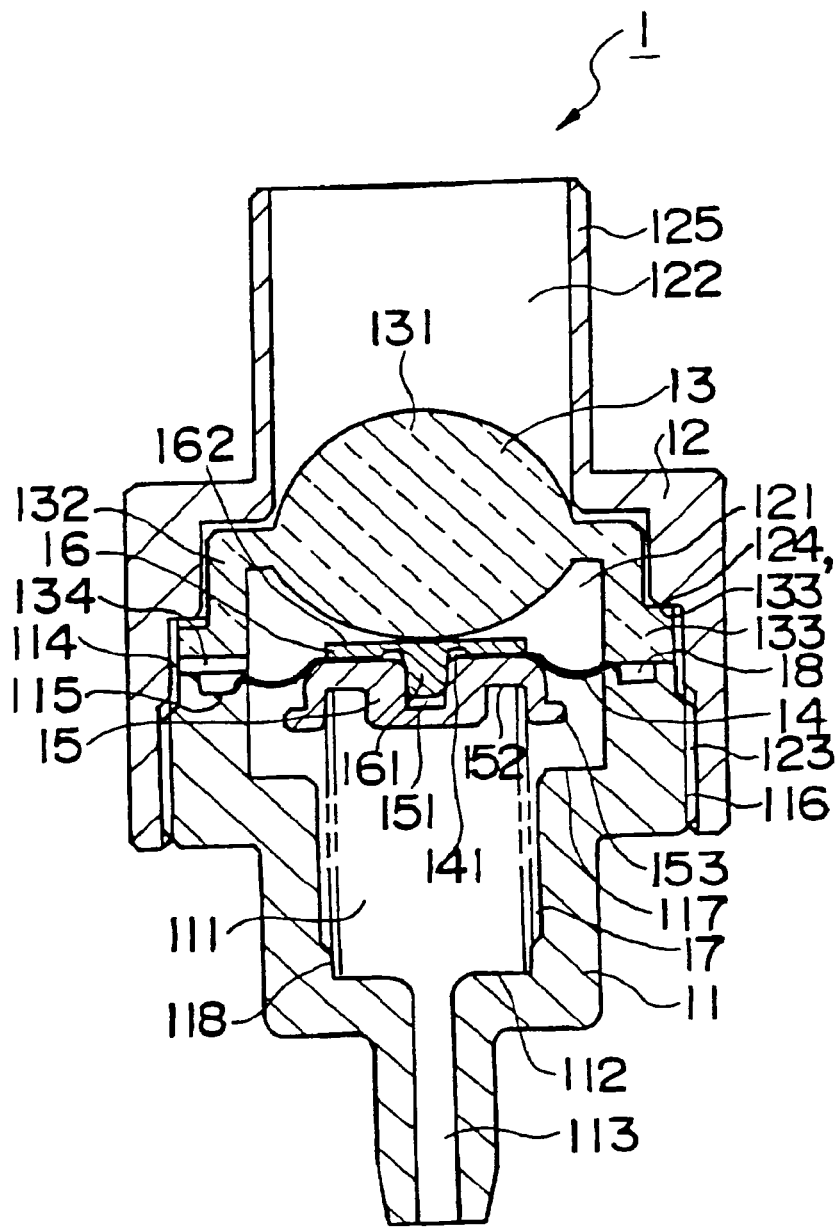
FIG. 1 is a vertical cross-sectional view showing the structure of a pressure detection indication device according to the present invention.

The preferred embodiment of the pressure detection indication device according to the present invention will be explained with reference to FIG. 1. FIG. 1 is a vertical cross-sectional view describing the structure of the pressure detection indication device according to the present invention.

The pressure detection indication device according to the present invention is a device for detecting the clogging of a filter disposed in an air flow passage of an air conditioning device or the like, composed of a pressure space provided at an end of a pressure communication pipe diverged from the air flow passage at either the primary side or the secondary side of the filter, a lens disposed at an end of the pressure space, a diaphragm extended across the pressure space in parallel to the lens, a mark attached to the surface of the diaphragm facing the lens, and a vent channel disposed between the diaphragm and the lens.

According to the pressure detection indication device having the above-mentioned structure, when the pressure in the air flow passage at the primary or secondary side of the filter changes, the diaphragm having the mark attached to the surface thereof moves immediately toward either the pressure space or the lens. Therefore, by visually observing the mark from the exterior via the lens, the occurrence of even a small pressure change in the air flow passage can be confirmed by the change in the indicated mark. As a result, the status of clogging or fouling of the filter can be determined easily.

The pressure detection indication device 1 according to the present invention is composed of a main body 11, a case 12, a lens 13, a diaphragm 14, a stopper 15, a rivet 16 and a spring 17. The main body 11 and the case 12 are assembled together and screwed onto one another, forming in its interior a space for housing the pressure detecting and indicating mechanism.

The main body 11 is, for example, a cylindrical body formed of synthetic resin having two step portions and an internal space 111. The main body 11 is provided with a pressure communication pipe portion 113 functioning as the pressure communication pipe and having one end opened to a bottom surface 112 disposed to the main body as one of the step portions in the internal space 111, a lens receive surface 114 disposed at the top end surface of the cylindrical body, an annular groove 115 formed to the lens receive surface for fixing the diaphragm, a screw portion 116 formed to the upper outer circumference surface of the cylindrical body, a stopper receive surface 117 formed as another step portion between the bottom surface 112 and the lens receive surface 114 of the body 11, and a spring fixture portion 118 formed to the bottom of the inner wall of the internal space 111.

The case 12 is, for example, a cylindrical body formed of synthetic resin and having an internal space 121. The case 12 has an observation window 122, a screw portion 123 provided to the inner circumference surface at the bottom of the cylindrical body that can be screwed onto the screw portion 116 of the main body, a lens receive surface 124 provided as a step portion to the internal space 121, and a hood 125 constituting the observation window 122.

The lens 13 can be, for example, an aspherical biconvex lens formed of synthetic resin. The lens 13 is integrally composed of a lens body 131, a pendent portion 132 extending downwardly from the circumference of the lens body 131, a flange portion 133 protruding outwardly from the lower end of the pendent portion, and an air vent groove 134 formed to extend from the lower surface of the flange portion 133 via the side surface to the upper surface thereof. Since the lens 13 in this embodiment is an aspherical biconvex lens, the change in the indication mark can be made quickly without any distortion during pressure change as described in detail later.

The diaphragm 14 is formed of a material having elasticity, such as synthetic rubber, with a peripheral size that substantially corresponds to the lens receive surface 114 of the main body, and having an opening 141 for receiving a rivet formed to the center area thereof.

The stopper 15 is formed for example of synthetic resin, and has a depression 151 for receiving a pin portion 161 of the rivet 16, a spring receive surface 152 formed to the lower face thereof, and a flange portion 153 extending to the outer circumference thereof. The lower face of the flange portion 153 comes into contact with the stopper receive surface 117 of the main body 11 and the movement of the stopper 15 is restricted, and thus, the diaphragm 14 can be prevented from being damaged, and the performance thereof can be protected.

The rivet 16 is formed for example of synthetic resin, and has a lower face equipped with a pin portion 161 and an upper face either having an indication mark printed thereon or having adhered thereto a label formed of a synthetic resin film with an indication mark drawn thereon.

The spring 17 is a biasing means formed for example of stainless steel, which biases the rivet 16 fixed to the stopper 15 to be pressed against the lower face of the lens 13. By adjusting the pressing force of the spring 17, the operating pressure can be set at will, and thus, it is easy to form pressure detection indication devices having different operating pressures. Therefore, the present pressure detection indication device is capable of corresponding to various types of filter units.

Now, the process for assembling the pressure detection indication device 1 being composed of the above components will be described. At first, a spring 17 is inserted to the internal space 111 of the main body 11, with the lower end of the spring 17 fixed to the spring fixture portion 118 at the lower inner wall of the body 11. The lower end of the spring 17 is in contact with and is supported by the bottom surface 112 of the main body 11.

After placing the diaphragm 14 on the upper face of the stopper 15, the pin portion 161 of the rivet 16 is inserted to the depression 151 on the stopper 15, thereby fixing the stopper 15, the diaphragm 14 and the rivet 16 in an airtight manner and assembling the indication member. If the airtight fixture of the stopper 15, the diaphragm 14 and the rivet 16 is achieved by attaching the rivet 16, there is no need to bond the diaphragm 14 onto the upper face of the stopper 15.

After the upper end of the spring 17 is brought into contact with the spring receive surface 152 of the stopper 15 constituting the indication member, the periphery of the diaphragm 14 is mounted on the lens receive surface 114 of the main body 11, an annular stopper 18 is fit to the annular groove 115 and the diaphragm 14 is fixed in airtight manner to the lens receive surface 114. The stopper 18 can also be formed integrally to the lower face of the flange portion 133 of the lens 13.

The flange portion 133 of the lens 13 is mounted on the lens receive surface 114. The case 12 is attached from above the lens 13, with the upper face 133' of the flange portion 133 of the lens 13 brought into contact with the lens receive surface 124 of the case 12. The case 12 is fixed to the main body 11 via the screw portion 123, and the assembly of the pressure detection indication device 1 is completed.

The internal space 121 of the case 12 communicates with the exterior via the air vent groove 134 and the gap between the case 12 and lens pendent portion 132.

The pressure detection indication device 1 assembled in the above manner is fixed for example to the air flow passage of an air conditioning device with the lower end of the pressure communication pipe 113 communicated with the air flow passage. During normal state, that is, when the pressure difference between the pressure in the internal space 121 of the case that communicates with the exterior and the pressure in the pressure space 111 of the body, that is, the pressure within the air flow passage, is small, the indication member either approximates or contacts the lower face of the lens 13 by the biasing force of the spring 17, and therefore, the indication mark is located either close to or in contact with the lens 13. When the pressure within the internal space 111 of the main body, that is, the pressure within the air flow passage, is reduced, the indication member is pushed down toward the internal space 111 of the body overcoming the biasing force of the spring 17, and the indication mark is moved away from the lens 13. When the pressure in the internal space 111 of the main body is further reduced, the indication member is pushed further downward until the lower face of the flange portion 153 of the stopper 15 contacts the stopper receive surface 117 of the body 11, by which the indication member is restricted from moving further downward, thus preventing damage to the diaphragm 14.

The internal space 121 of the case is communicated with the exterior via the air vent groove 134, so it does not prevent the indication member from moving rapidly along with the vertical movement of the diaphragm 14 in response to the change in pressure.

When the pressure inside the internal space 111 of the main body is returned to its original state, the indication member returns to its initial position by the biasing force of the spring 17, and prepares for use again.

The operation for indicating the pressure reduction according to the pressure detection indication device 1 of the present invention will now be described with reference to FIG. 2. When the pressure is at normal state, the arrow (that is, the indication mark printed on the surface 162 of the rivet 16) disposed at the rear side (left side in the drawing) of the lens 13 is at position A. When a user looks into the lens 13 from the right side, the user will recognize the arrow as an enlarged virtual image located at position A'.

When the pressure in the internal space 111 is reduced to a value capable of overcoming the biasing force (pushing force) of the spring 17, the arrow is moved to position B. At this time, when the user looks into the lens 13 from the right side, the user will recognize the arrow as an extremely enlarged virtual image located at position B'. In such case, the enlarged virtual image extends beyond the outside of the hood 125 of the observation window 122 shown in FIG. 1, and the outer circumference thereof cannot be viewed.

With the outer circle moving out of view, the user can recognize that the pressure in the internal space 111 of the main body is reduced to below a predetermined pressure.

The hood 125 on the observation window 122 allows the user to view the indication mark only from the position directly confronting the indication mark, enabling the user to observe the change of pressure correctly.

Figure 2:
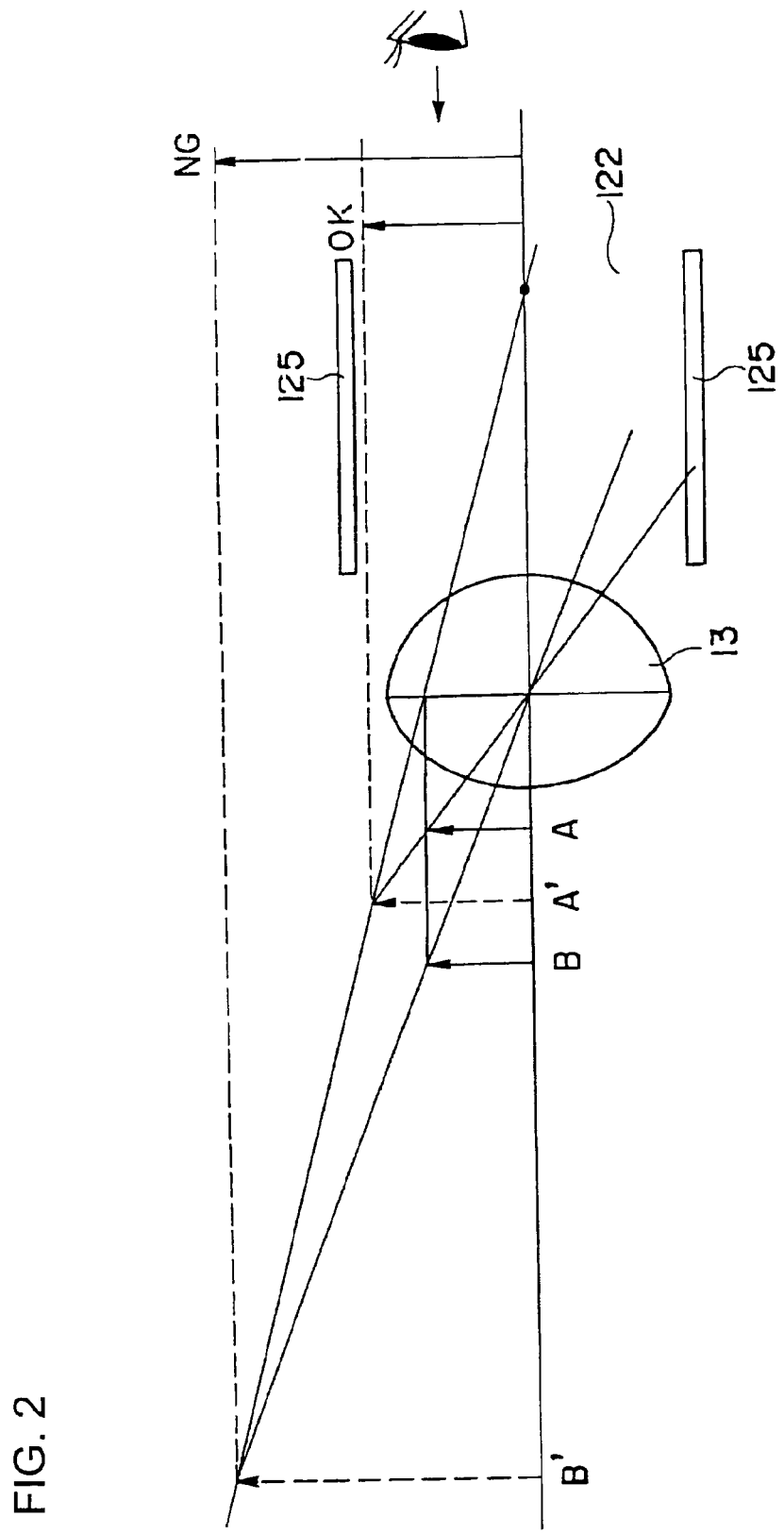
FIG. 2 is an explanatory view showing the indication principle of the pressure detection indication device according to the present invention.
Figure 3:
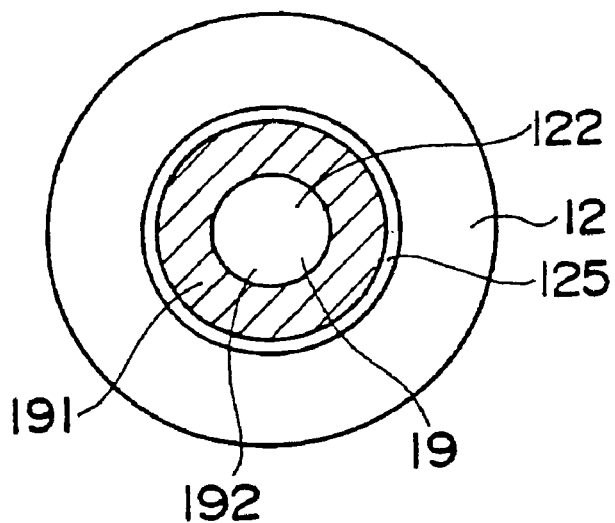
FIG. 3 is an explanatory view showing the status of pressure indication (normal state)
Figure 4:
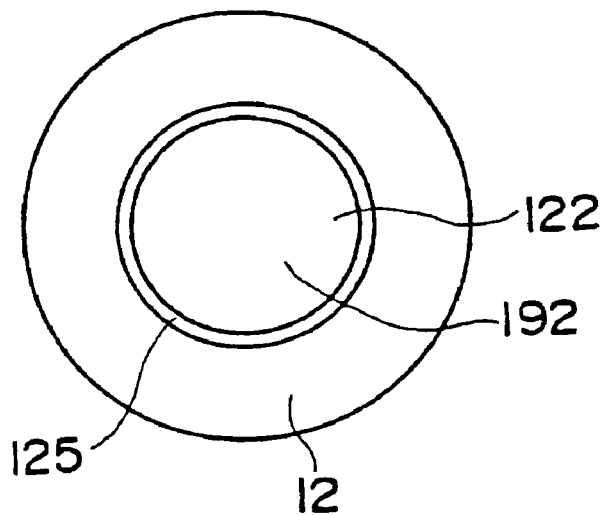
FIG. 4 is an explanatory view showing the status of pressure indication (pressure reduced state)

With reference to FIGS. 3 and 4, examples of the indication mark displayed on the observation window 122 will be explained. As shown in FIG. 3, the indication mark 19 disposed on the surface 162 of the rivet 16 is composed of, for example, a circular ring portion 191 colored in red and a center circle portion 192 in white. When the indication mark 19 is at position A of FIG. 2, that is, when the pressure inside the internal space 111 is normal, the whole indication mark 19 can be seen through the observation window 122 as shown in FIG. 3.

In this state, if clogging of the filter occurs, for example, and the pressure inside the internal space 111 is reduced, the indication mark 19 moves to position B of FIG. 2, along with which the virtual image is enlarged, so only the center circle portion 192 of the indication mark 19 can be seen through the observation window 122 as shown in FIG. 4.

Thus, according to the present invention, it becomes possible to detect and indicate the reduction of pressure within the air flow passage to below a predetermined value with a simple configuration. By adopting a circular indication mark, it becomes possible to provide an indication device with good visibility.

According to the above description, the indication mark 19 is a single circular ring. However, by adopting multiple concentric circles of different colors, it becomes possible to indicate the pressure level in the internal space 111 or the amount of pressure reduction in the air flow passage with a simple configuration. Furthermore, the indication mark 19 is not restricted to concentric circles, and any mark can be adopted as long as it is capable of indicating the position of movement of the mark 19 based on the size of the virtual image.

Figure 5:
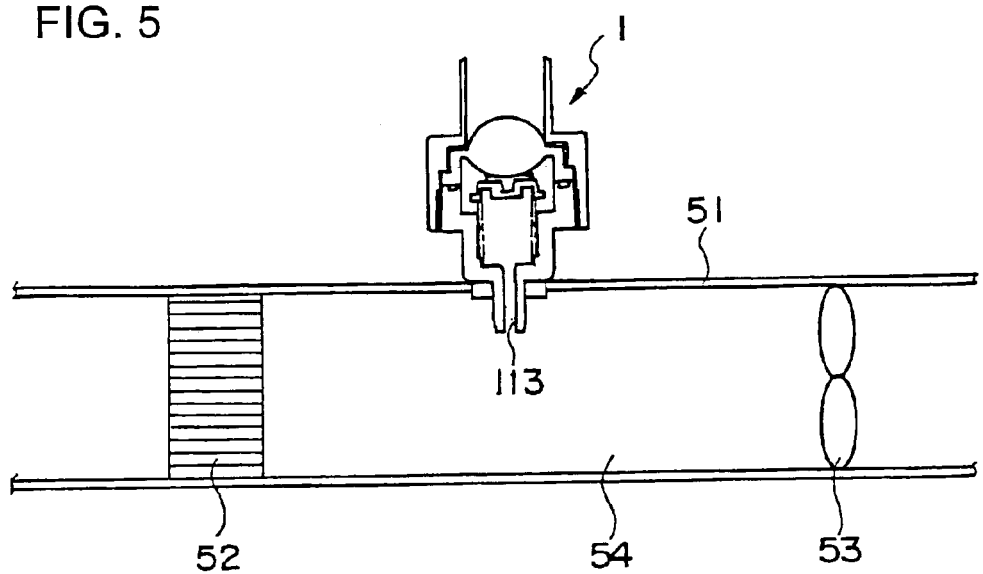
FIG. 5 is an explanatory view showing the outline of the structure of a clog detector using the pressure detection indication device.

FIG. 5 is used to explain the preferred embodiment of a clog detector according to the present invention using the pressure detection indication device illustrated in FIGS. 1 through 4. FIG. 5 is an explanatory view showing the arrangement in which the pressure detection indication device according to the present invention is mounted to the air flow passage of an air conditioning device as a clog detector of a filter. The pressure detection indication device 1 is the same as the pressure detection indication device shown in FIGS. 1 through 4, and this indication device is attached as a clog detector to, for example, the lower stream side of a filter 52 on a duct 51 of the air conditioner. In the drawing, the pressure detection indication device 1 is disposed on the air flow passage 54 with the pressure communication passage of the pressure communication pipe 113 communicated with the air flow passage between the filter 52 and a fan 53 positioned downstream thereof. When the clogging of the filter 52 progresses, the pressure within the air flow passage 54 is reduced along with which the diaphragm 14 is pulled downward, and the image of the indication mark 19 displayed on the observation window 122 is enlarged, looking like the image shown in FIG. 4. Thus, the present invention enables the clogging of the filter 52 to be detected visually from the exterior. Based on this detection, it becomes possible to replace the filter 42 at necessary timings.

According to the above description, the main body 11 and the case 12 are fixed together via a fixing method using the screw portions 116 and 123 provided to the main body 11 and the case 12, but instead of screwing, the main body 11 and the case 12 can be fixed to each other via other fixing methods such as welding.

According to the above description, a spring 17 is used to push the indication member toward the lens, but other arrangements can be adopted, such as fixing both ends of the spring 17 to the spring fixture portion 118 and spring receive surface 152 so as to pull the stopper 15 composing the indication member toward the stopper receiver surface 117 during normal state, or providing a spring receive portion to the upper area of the internal space 111 of the main body 11 and disposing the spring 17 so as to push the flange portion 153 of the stopper 15 toward the receive portion. In these examples, the indication illustrated in FIG. 4 is achieved during the normal state, and when the pressure is raised, the indication illustrated in FIG. 3 is achieved. By adopting such arrangements, the increase of pressure in the air flow passage can be detected, and therefore, the increase of pressure in the air flow passage upstream of the filter in the air conditioning device caused by the clogging of the filter can be detected.

As described, the present invention provides a pressure detection indication device capable of detecting and indicating the change in pressure with a simple structure, and a clog detector using the same.

What is claimed is:

1. A pressure detection indication device comprising:
    a main body having an internal space of the body communicated with a space to be subjected to pressure detection;
    a case having an internal space of the case communicated with a space that is different from the internal space of the body;
    a diaphragm airtightly separating the internal space of the body from the internal space of the case;

an indication mark attached to the diaphragm and positioned in the internal space of the case;

a stopper member attached to a back surface of the diaphragm;

a lens disposed within the case;

a biasing means biasing the diaphragm either toward or away from the lens; and a stopper receive surface disposed in the internal space of the body.

2. The pressure detection indication device according to claim 1, wherein the indication mark is provided on the surface of a stopper member attached airtightly to the diaphragm.

3. The pressure detection indication device according to claim 1 or claim 2, wherein the indication mark consists of concentrically arranged and colored multiple circles.

4. The pressure detection indication device according to claim 1 or claim 2, wherein a cylindrical hood is disposed to the outer side of the lens to form an observation window.

5. The pressure detection indication device according to claim 1 or claim 2, wherein the lens is an aspherical biconvex lens.

6. A clog detector comprising the pressure detection indication device according to claim 1 or claim 2, having a pressure communication passage communicating with an air flow passage at either an upstream side or a downstream side of a filter.

* * * * *